United States Patent Office 3,005,034
Patented Oct. 17, 1961

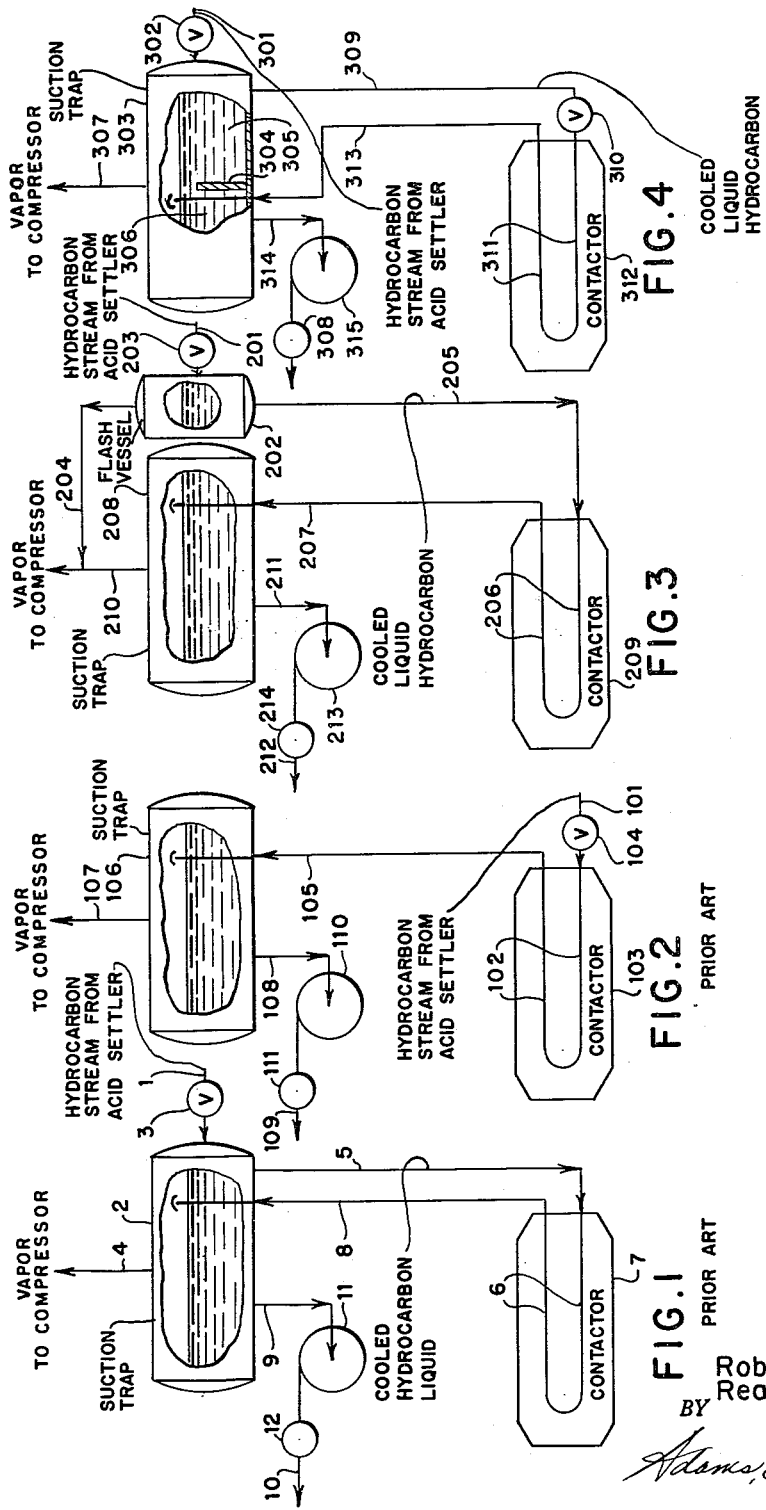

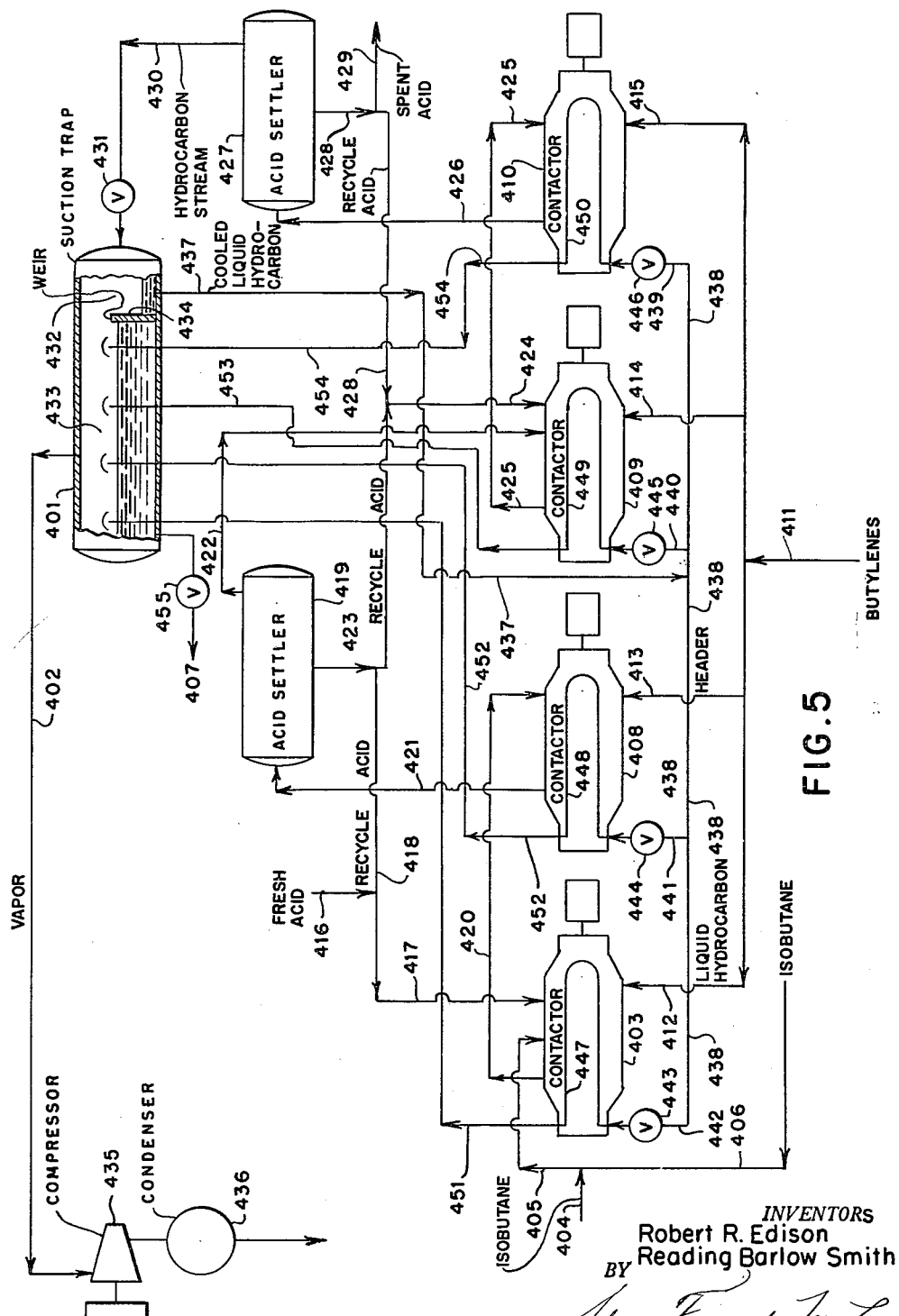

3,005,034
PROCESS FOR ALKYLATION UTILIZING
EFFLUENT REFRIGERATION
Robert R. Edison, Chicago Heights, and Reading Barlow
Smith, Flossmoor, Ill., assignors to Sinclair Refining
Company, New York, N.Y., a corporation of Maine
Filed July 7, 1959, Ser. No. 825,583
20 Claims. (Cl. 260—683.62)

This invention relates to the production of alkylate, a useful motor fuel ingredient, by reacting a lower isoalkane and a lower monoolefin. More particularly, this invention relates to improvements in effluent refrigeration.

The production of alkylate by reacting isoalkanes, such as isobutane and isopentane, and lower monoolefins, such as propylene and butylene, in liquid phase while the reactants are in admixture with a liquid alkylation catalyst, such as strong sulfuric acid or hydrogen fluoride, is an operation which is carried out on a very large scale by the petroleum industry. With sulfuric acid, the reaction is generally performed under the following approximate conditions: reaction temperature, 35° F. to 75° F.; acid strength, 90 to 100 weight percent (titrable acidity); 40 to 50 percent by volume of sulfuric acid and 60 to 50 percent by volume of hydrocarbons in the reaction zone; and overall ratio of isoalkane feed to olefin feed of from 5:1 to 15:1 by volume. Since heat is liberated by the reaction, the reaction mixture is cooled while the reaction is taking place.

Although theoretically only equimolar ratios of isoalkane and monoolefin are required by the reaction, a large excess of isoalkane in the reaction zone has been found to be necessary to surpress undesirable side reactions which result in loss of yield and octane number. Evaporation of a portion of this excess isoalkane has been resorted to by the art as a means of providing cooling. One method involving evaporation of a portion of the excess isoalkane is known as "effluent refrigeration." This particular method is shown, for example, in U.S. Patent Number 2,664,452. A stream composed of a mixture of acid catalyst and hydrocarbons containing alkylation products and excess isoalkane is withdrawn from the reactor or contactor and passed into an acid settler where an acid layer and a hydrocarbon layer are formed. Hydrocarbon is withdrawn from the settler and passed to an evaporation cooler or suction trap which is maintained at a somewhat lower pressure than the reactor. The reduction in pressure is effected by means of a compressor, the inlet side of which is connected to the suction trap. As a result of the pressure reduction in the suction trap, isoalkane in vapor form is removed therefrom through the compressor and the liquid hydrocarbon remaining in the suction trap is cooled. A portion of this cooled hydrocarbon is passed in indirect heat exchange with the alkylation reaction mixture in the reaction zone to provide temperature control and then back to the suction trap, and the remainder is handled further for the recovery of such product and such isoalkane as it contains. The indirect heat exchange is generally carried out by passing the cooled hydrocarbons through a tube bundle which is located within the vessel in which the alkylation reaction is being conducted. Isoalkane vapors compressed in the compressor are liquified by cooling and returned to the alkylation reaction zone.

FIGURE 1 shows in simplified form the effluent refrigeration aspects of the operation just described. Thus, a stream of hydrocarbons, containing alkylate and excess isoalkane separated in the acid settler is introduced by means of line 1 into suction trap 2. Back pressure control valve 3 is provided to maintain the pressure on the acid settler and on the alkylation reactor at the proper level. A liquid layer of hydrocarbons is maintained in suction trap 2 as shown. Line 4 is connected to the suction side of a compressor which removes vaporized hydrocarbons, largely isoalkane, from the suction trap in order to cool the liquid hydrocarbons present therein. Liquid hydrocarbons flow from the suction trap through line 5, thence through tube bundle 6 located in reaction vessel or contactor 7, and from this by means of line 8 back to suction trap 2. By this means the temperature of the isoalkane and monoolefin undergoing the alkylation reaction in contactor 7 is maintained at the proper level. Hydrocarbons are also withdrawn from suction trap 2 by means of lines 9 and 10 and pump 11. Liquid level control 12 is provided in order to maintain the liquid level in suction trap 2 at an appropriate position. After having been compressed, the isoalkane-containing vapors passing through line 4 are cooled, condensed, and recycled to the reactor. Also, the liquid passing through line 10 is fractionated to remove excess isoalkane for further use and also to recover the desired alkylate product.

In a typical operation such as is described in FIGURE 1, in which isobutane and butenes are reacted, the hydrocarbons flowing through line 1 are at a temperature of 45° F. The liquid in the suction trap is at a temperature of 26° F. and is at 15.2 p.s.i.a. At the point where the liquid flowing through line 5 enters contactor 7, the temperature is 26° F. and the liquid is at 16.2 p.s.i.a. At the point where the hydrocarbons passing through line 6 leave contactor 7 they are at 29° F. and 15.7 p.s.i.a and they contain 5 percent by weight of vapor. Alkylation reaction mixture present in contactor 7 is at a temperature of 45° F. The mean temperature difference between the alkylation reaction mixture and the refrigerant is 16° F., this being the difference between 45° F. and the mean temperature (29° F.) of the boiling liquid passing through line 5.

FIGURE 2 shows in simplified form a second type of effluent refrigeration system. In the operation of FIGURE 2, hydrocarbon liquid from the acid settler is introduced by means of line 101 into tube bundle 102 which is positioned in the alkylation reaction vessel or contactor 103. Back pressure control valve 104 is provided to maintain the pressure in the acid settler and in the alkylation reaction vessel at the proper level. After having passed through tube bundle 102, the hydrocarbons are introduced by means of line 105 into suction trap 106. Hydrocarbons in vapor form are removed from suction trap 106 by means of line 107 which is connected to the suction side of a compressor (not shown). Liquid hydrocarbons are removed from suction trap 106 by means of lines 108 and 109 and pump 110. Valve 111 serves to maintain the level of the liquid in suction trap 106 at the proper position.

In an operation comparable to that described in FIGURE 1, the hydrocarbons on the upstream side of valve 104 are at a temperature of 45° F. and on the downstream side are at a temperature of 25° F. and 17.2 p.s.i.a. With the alkylation reaction mixture being maintained at 45° F., the hydrocarbons when they leave tube bundle 102 are at 33° F. and 17.1 p.s.i.a. and contain 42.1 percent by weight of vapor. The liquid present in suction trap 106 is at 31° F. and 16.8 p.s.i.a.

FIGURE 2 shows a system wherein the hydrocarbon effluent from the acid settler is flashed directly into the contactor tubes. The liquid fed to the tubes contains a considerably higher proportion of low boiling materials (isoalkane) than was the case in the operation described in FIGURE 1, and in the operation of FIGURE 2 a given mean temperature difference between the alkylation reaction mixture and the refrigerant can be obtained at a higher suction trap pressure. Thus, in the operation of FIGURE 2, this mean temperature difference is 16° F., and the system will handle the same heat load as in the operation of FIGURE 1 even though the suction trap pressure is 1.6 p.s.i.a. higher in the operation of FIGURE 2 than in the operation of FIGURE 1. The compressor discharge pressure will be the same in both cases (typically 91.3 p.s.i.a.), so that the compression ratios compare as follows:

FIGURE 1, 91.3/15.2 or 6.0; and
FIGURE 2, 91.3/16.8 or 5.4

The operation of FIGURE 2 thus shows a considerable reduction in the compression ratio at which the compressor is operated and hence a definite reduction in refrigeration cost.

Operation of the effluent refrigeration system in the manner described in FIGURE 2 does, however, present some disadvantage. Thus, some flashing takes place at the pressure control valve 104, and hence some of the tubes of the tube bundle 102 may have only vapor flowing in them. Unless evaporating liquid is flowing through a tube, some of the effective area for heat exchange is lost.

The present invention provides an effluent refrigeration system which possesses advantage in that the inlet pressure to the compression system is relatively high and also in that refrigerated liquid hydrocarbons free from vapors are passed in indirect heat exchange with the alkylation reaction step. In accordance with the improvement in this invention, the hydrocarbon phase after it has been removed from the acid settler is subjected to an evaporative cooling step, to provide refrigerated hydrocarbon liquid and a first quantity of hydrocarbon vapors. The refrigerated hydrocarbon liquid is passed in indirect heat exchange with the alkylation reaction mixture and when this is done a portion of the refrigerated hydrocarbon liquid is vaporized to form a second quantity of hydrocarbon vapors. After the refrigerated hydrocarbon liquid has been passed in indirect heat exchange with the alkylation reaction mixture, the resulting vapor and liquid portions of the refrigerant are separated at substantially the same pressure as the first evaporative cooling step. Vapors produced are passed to the compression system, and alkylate is recovered from the hydrocarbon liquid remaining after the second evaporative cooling step.

FIGURE 3 illustrates a type of operation falling within the scope of the this invention. In the operation of FIGURE 3, the effluent from the acid settler is flashed down to suction trap pressure in a separate vessel and liquid remaining after the flashing flows to the contactor. Thus, in the operation of FIGURE 3, liquid hydrocarbons from the acid settler are introduced by means of line 201 into vessel 202, valve 203 serving to maintain the proper pressure on the acid settler and alkylation reaction zone. Hydrocarbon vapors are withdrawn overhead by means of line 204 which is connected to the inlet of a compressor (not shown). Liquid hydrocarbons are removed from the bottom of the vessel 202 by means of line 205, and they flow through tube bundle 206 and thence by means of line 207 to suction trap 208. The numeral 209 represents the alkylation reaction vessel or contactor. Vapors are withdrawn overhead from suction trap 208 by means of line 210 and liquid hydrocarbons are withdrawn from the bottom thereof by means of lines 211 and 212 and pump 213 for the recovery of alkylate product and isoalkane present therein. Valve 214 serves to maintain the level of liquid in suction trap 208 at the proper position.

Disregarding the problem of flashing encountered in the operation of FIGURE 2, the results obtained in operating according to FIGURE 2 and FIGURE 3 are essentially the same. Thus, when operating according to the procedure of FIGURE 3 and on a basis comparable to the operations of FIGURE 1 and FIGURE 2, the hydrocarbons passing through line 201 are at a temperature of 45° F. The liquid present in vessel 202 is at 23° F. and 16.8 p.s.i.a. The liquid in line 205 as it enters tube bundle 206 is at 23° F. and 17.2 p.s.i.a. and has a bubble point of 24° F. The hydrocarbons leaving tube bundle 206 and entering line 207 are at 33° F. and 17.1 p.s.i.a. and contain 42.1 percent by weight of vapor. The liquid present in suction trap 208 is at 31° F. and 16.8 p.s.i.a.

FIGURE 4 illustrates a second embodiment falling within the scope of this invention. As can be seen from an inspection of FIGURE 4, a dividing weir is provided in the suction trap. As the process is generally carried out, liquid hydrocarbons from the acid settler flow through line 301 and back pressure regulator 302 into suction trap 303 which is provided with internal weir 304. The weir divides the suction trap into sections 305 and 306. Hydrocarbon vapors are removed from suction trap 303 by means of line 307 which is connected with the suction side of a compressor (not shown). The liquid level in the suction trap is maintained 2 or 3 inches above the weir by means of valve 308, which is responsive to the liquid level in the suction trap. There may be a small flow of liquid in either direction between section 305 and section 306. However, most of the liquid in section 305 flows downwardly through line 309, and flow-regulating valve 310 into tubes 311 positioned in contactor 312. The hydrocarbon liquid and the vapors produced in tubes 311 flow by means of line 313 into section 306 of the suction trap. Liquid is also withdrawn from section 306 by means of line 314 and pump 315 for the recovery of alkylate and isoalkane present therein for recycle. When the system is operated in this fashion, the temperatures and pressures are substantially the same as in the operation of FIGURE 3.

The weir arrangement of FIGURE 4 possesses certain advantages. Thus, the weir tends to prevent the initial refrigerant collecting zone 305 from becoming dry. Where a plurality of lines corresponding to line 309 are each connected to a plurality of contactors 312 it is particularly important that an adequate supply of refrigerant be available, or otherwise uneven flow of refrigerant to the various contactors and consequent uneven cooling of the contactors may result. Also, the weir is a safeguard against the possibility that the initial refrigerant collecting zone 305 may fill and discharge liquid through line 307 to the compressor with resultant damage to the compressor. Finally, a single vessel 303 is less expensive to build than are vessels 202 and 208 of FIGURE 3.

*Example*

FIGURE 5 sets forth an embodiment of the invention in greater detail. In accordance with the operation and apparatus of FIGURE 5, a plurality of contactors are arranged in series and monoolefin hydrocarbon is fed into each contactor. Thus, isobutane recovered from the vapors removed in suction trap 401 through line 402 is introduced into contactor 403 by means of lines 404 and 405. Also, into contactor 403 there is introduced through lines 406 and 405 fresh isobutane and isobutane recovered from the hydrocarbon stream withdrawn from suction trap 401 by means of line 407. The numerals 408, 409 and 410 also represent contactors,. Butylenes are introduced into the alkylation system by means of line 411, and the butylenes are introduced into contactors 403, 408, 409 and 410 by means of lines 412, 413, 414 and 415, respectively.

Fresh sulfuric acid is introduced into contactor 403 by means of lines 416 and 417, along with recycle sulfuric acid from acid settler 419 passing through line 418. A stream composed of a mixture of hydrocarbons and sulfuric acid is withdrawn from contactor 403 by means of line 420 and introduced into contactor 408. From contactor 408 by means of line 421 there is removed a mixture of hydrocarbons and sulfuric acid and this mixture is introduced into acid settler 419, at the top of which through line 422 there is withdrawn a stream of hydrocarbons and through the bottom of which there is withdrawn a stream of sulfuric acid.

The hydrocarbons removed from settler 419 through line 422 are introduced into contactor 409 and the acid removed from the bottom of settler 419 not returned to contactor 403 by means of lines 418 and 417 is introduced by means of lines 423 and 424 into contactor 409. From contactor 409 by means of line 425 there is passed a mixture of hydrocarbons and sulfuric acid and this mixture is introduced into contactor 410. From contactor 410 by means of line 426 there is removed a mixture of hydrocarbons and sulfuric acid and this mixture is introduced into acid settler 427. From the bottom of settler 427 through line 428 there is removed a stream of sulfuric acid for recycling, and by means of line 429 spent sulfuric acid is removed from the system. Operating conditions are adjusted so at to maintain an alkylation reaction temperature of approximately 45° F. in contactors 403, 408, 409 and 410.

From the top of acid settler 427 by means of line 430 there is removed a stream of hydrocarbons having a temperature of approximately 45° F., flowing at the rate of 325,000 pounds per hour. This stream is composed of the following materials in the following percentages by weight: $n-C_3$, 5.1; $i-C_4$, 55.0; $n-C_4$, 20.4; $i-C_5$, 2.3; $n-C_5$, 0.2; and $C_6^+$, 17.0.

Before entering suction trap 401, the hydrocarbons flowing through line 430 pass through back pressure regulator 431. Suction trap 401 is divided into sections 432 and 433 by means of internal weir 434, the former being on the upstream side of the weir. Suction trap 401 is operated at a pressure of 16.8 p.s.i.a., the pressure reduction to this low pressure being effected by removing hydrocarbon vapors overhead from the suction trap by means of line 402 which is connected with the inlet side of compressor 435. The hydrocarbon stream flowing through line 402 flows at the rate of 141,000 pounds per hour and is composed of the following materials in the following percentages by weight: $n-C_3$, 9.0; $i-C_4$, 68.5; $n-C_4$, 20.9; $i-C_5$, 1.1; $n-C_5$, 0.1; and $C_6^+$, 0.4.

After being compressed by compressor 435 the hydrocarbons flowing through line 402 are condensed by means of condenser 436. Isobutane condensate is recycled to the alkylation system by introducing it by means of line 404.

As a result of the reduction of pressure caused by the operation of compressor 435, the temperature of the liquid hydrocarbons in section 432 is reduced to 23° F. Liquid hydrocarbons flow from the bottom of section 432 by means of line 437, at the rate of 303,000 pounds per hour, the liquid hydrocarbons being composed of the following materials in the following percentages by weight: $n-C_3$, 4.3; $i-C_4$, 54.2; $n-C_4$, 20.6; $i-C_5$, 2.5; $n-C_5$, 0.2; and $C_6^+$, 18.2. The liquid flowing through line 437 enters header 438 positioned below the contactors and is divided into streams 439, 440, 441 and 442 which flow upwardly into the tube bundles 450, 449, 448 and 447 in the alkylation reactors in such proportions as to maintain the alkylation temperature in the contactors 410, 409, 408 and 403 at approximately 45° F. Valves 443, 444, 445 and 446 are provided primarily for isolating reactors for maintenance or for adjustment in case one contactor bundle becomes restricted. The advantage of header 438 is to provide equal distribution to the contactors without adjustment under normal operating conditions. From the tube bundles by means of lines 451, 452, 453 and 454 there is passed to section 433 mixtures of gaseous and liquid hydrocarbons each of which is composed of 42.1 percent by weight of vapor and is at a temperature of 33° F. at the outlet of the tube bundles.

Valve 455 is responsive to the liquid level in section 433 and maintains that level 2 or 3 inches below weir 434. The hydrocarbon stream containing alkylate is withdrawn from section 433 by means of line 407 through valve 455. This stream is fractionated for the recovery of alkylate and also for the recovery of excess isobutane, which is introduced into the system through line 406, together with fresh isobutane.

It is claimed:

1. In an alkylation process wherein a lower isoalkane and a lower monolefin are contacted in liquid phase with a liquid acid alkylation catalyst in an alkylation reaction step, a mixture of hydrocarbons is withdrawn with the catalyst as effluent from the reaction step, the effluent is separated into a hydrocarbon phase and an acid phase in an acid separating step, the pressure on the hydrocarbon phase is reduced by means of a compression system in an evaporative cooling step whereby the hydrocarbons are refrigerated and the refrigerated liquid hydrocarbons are passed in indirect heat exchange with the alkylation reaction mixture, the steps of subjecting the hydrocarbon phase after it is removed from the acid settler to an evaporative cooling step to provide refrigerated hydrocarbon liquid and a first quantity of hydrocarbon vapors, passing the refrigerated hydrocarbon liquid as a refrigerant in indirect heat exchange with the alkylation reaction mixture whereby a portion of the refrigerated hydrocarbon liquid is vaporized to form a second quantity of hydrocarbon vapors, separating the resulting vapor and liquid portions of the refrigerant at substantially the same pressure as the evaporative cooling step while substantially impeding mixing of the liquid portion of the refrigerant with the hydrocarbon phase subjected to the evaporative cooling step, passing vapors produced to the compression system, and recovering alkylate from the hydrocarbon liquid remaining after the separating step.

2. The process of claim 1 wherein the lower isoalkane is isobutane.

3. The process of claim 1 wherein said lower monoolefin is a butylene.

4. The process of claim 1 wherein the alkylation catalyst is sulfuric acid.

5. The process of claim 1 wherein said lower isoalkane is isobutane, wherein said lower monoolefin is a butylene and wherein the alkylation catalyst is sulfuric acid.

6. In an alkylation process wherein a lower isoalkane and a lower monoolefin are contacted in liquid phase with a liquid acid alkylation catalyst in an alkylation reaction step, a mixture of hydrocarbons is withdrawn with the catalyst as effluent from the reaction step, the effluent is separated into a hydrocarbon phase and an acid phase in an acid separating step, the pressure on the hydrocarbon phase is reduced by means of a compression system in an evaporative cooling step whereby the hydrocarbons are refrigerated and the refrigerated liquid hydrocarbons are passed in indirect heat exchange with the alkylation reaction mixture, the steps of effecting the evaporative cooling step in a vessel provided with a weir, maintaining the level of the liquid hydrocarbon in the vessel above the weir, introducing the hydrocarbon phase from the acid separating step into the vessel on the upstream side of the weir, withdrawing liquid refrigerated liquid hydrocarbons from the vessel on the upstream side of the weir and passing them in indirect heat exchange with the alkylation reaction mixture and from thence into the vessel on the downstream side of the weir, and withdrawing from the vessel on the downstream side of the weir a stream of hydrocarbons containing alkylate.

7. The process of claim 6 wherein the lower isoalkane is isobutane.

8. The process of claim 6 wherein said lower monoolefin is a butylene.

9. The process of claim 6 wherein the alkylation catalyst is sulfuric acid.

10. The process of claim 6 wherein said lower isoalkane is isobutene, wherein said lower monoolefin is a butylene and wherein the alkylation catalyst is sulfuric acid.

11. The process of claim 6 wherein the refrigerated hydrocarbons are divided into a plurality of streams each of which is passed in indirect heat exchange through one of a plurality of vessels in which alkylation is being effected.

12. Apparatus suitable for use in the alkylation of isobutane with a butylene in liquid phase and in admixture with sulfuric acid catalyst to form alkylate comprising a plurality of alkylation vessels provided with indirect heat exchange, means for regulating the temperature in the alkylation vessels, a separating vessel, means for transferring a mixture comprising sulfuric acid and hydrocarbons from the alkylation vessels to the separating vessel, a suction trap vessel provided with a weir, means for transferring hydrocarbons from the separating vessel to the suction trap vessel upstream of the weir, a plurality of means for supplying liquid hydrocarbons from the suction trap vessel upstream of the weir to the heat exchange means located in the alkylation vessels and from thence to the downstream side of the weir, and means for withdrawing hydrocarbon liquid from the downstream side of the weir for alkylate recovery.

13. Apparatus according to claim 12 wherein the means for supplying liquid hydrocarbons from the suction trap vessel to the heat exchange means includes a header positioned below the alkylation vessels.

14. Apparatus suitable for use in the alkylation of isobutane with a butylene in liquid phase and in admixture with sulfuric acid catalyst to form alkylate comprising a plurality of alkylation vessels provided with indirect heat exchange, means for regulating the temperature in the alkylation vessels, a separating vessel, means for transferring a mixture comprising sulfuric acid and hydrocarbons from the alkylation vessels to the separating vessel, a suction trap vessel, means for transferring hydrocarbons from the separating vessel to the suction trap vessel, a plurality of means for supplying liquid hydrocarbons from the suction trap vessel to the heat exchange means located in the alkylation vessels, a second separating vessel, means for transferring a mixture of liquid and hydrocarbon vapors from the heat exchange means to said second separating vessel, means connecting the suction trap vessel and the second separating vessel whereby hydrocarbon vapors present in each of these vessels are maintained at substantially the same pressure, and means for withdrawing hydrocarbon liquid from the second separating vessel for alkylate recovery.

15. Apparatus according to claim 14 wherein the means for supplying liquid hydrocarbons from the suction trap vessel to the heat exchange means includes a header positioned below the alkylation vessels.

16. The process of claim 1 in which the evaporative cooling step and separating step are carried out in separate vessels.

17. The process of claim 16 wherein the lower isoalkane is isobutane.

18. The process of claim 16 wherein said lower monoolefin is a butylene.

19. The process of claim 16 wherein the alkylation catalyst is sulfuric acid.

20. The process of claim 16 wherein said lower isoalkane is isobutane, wherein said lower monoolefin is a butylene and wherein the alkylation catalyst is sulfuric acid.

References Cited in the file of this patent
UNITED STATES PATENTS

| | | |
|---|---|---|
| 2,664,452 | Putney | Dec. 29, 1953 |
| 2,760,918 | Barr | Aug. 28, 1956 |
| 2,865,971 | Beavon | Dec. 23, 1958 |

OTHER REFERENCES

Stiles: "Petroleum Refiner," vol. 34, No. 2, pp. 103–6, February 1955.